(12) United States Patent
Tripathi et al.

(10) Patent No.: US 9,705,691 B2
(45) Date of Patent: *Jul. 11, 2017

(54) TECHNIQUES TO MANAGE RECORDINGS FOR MULTIMEDIA CONFERENCE EVENTS

(71) Applicant: MICROSOFT TECHNOLOGY LICENSING, LLC, Redmond, WA (US)

(72) Inventors: Ashutosh Tripathi, Hyderabad (IN); Nagesh Pabbisetty, Hyderabad (IN); Subrata Roychoudhuri, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/508,353

(22) Filed: Oct. 7, 2014

(65) Prior Publication Data

US 2015/0026603 A1 Jan. 22, 2015

Related U.S. Application Data

(63) Continuation of application No. 12/129,694, filed on May 30, 2008, now Pat. No. 8,887,067.

(51) Int. Cl.
*H04L 12/18* (2006.01)
*H04L 12/58* (2006.01)
(Continued)

(52) U.S. Cl.
CPC ........ *H04L 12/1831* (2013.01); *G06F 3/0481* (2013.01); *H04L 12/581* (2013.01);
(Continued)

(58) Field of Classification Search
CPC ... H04L 65/403; H04L 12/1818; H04L 51/04; H04L 12/1813; H04L 12/1831; H04N 7/15
See application file for complete search history.

(56) References Cited

U.S. PATENT DOCUMENTS 6,144,991 A * 11/2000 England ............ G06F 17/30873
707/E17.111
6,343,313 B1 1/2002 Salesky et al.
(Continued)

OTHER PUBLICATIONS

"Web Conferencing Software", <http://www.wiredred.com/web-conferencing/>, 4 pages, (Author unknown).
(Continued)

*Primary Examiner* — Ryan Pitaro

(57) ABSTRACT

Techniques to manage recordings for multimedia conference events are described. An apparatus may comprise a recording management component operative to manage recording and reproduction operations for a multimedia conference event. The recording management component may comprise an event capture module operative to record a multimedia conference event to form a recorded meeting event. The recording management component may comprise an event entity module communicatively coupled to the event capture module, the event entity module operative to generate an entity event list for the recorded meeting event. The recording management component may comprise an event reproduction module communicatively coupled to the event entity module, the event reproduction module operative to reproduce the recorded meeting event. The recording management component may comprise an event interface module communicatively coupled to the event reproduction module, the event interface module operative to display presence information for one or more entities from the entity event list (Continued)

while reproducing the recorded meeting event. Other embodiments are described and claimed.

20 Claims, 6 Drawing Sheets

(51) Int. Cl.
H04M 3/42 (2006.01)
H04M 3/56 (2006.01)
H04L 29/06 (2006.01)
H04L 29/08 (2006.01)
G06F 3/0481 (2013.01)

(52) U.S. Cl.
CPC ............ *H04L 51/04* (2013.01); *H04L 65/403* (2013.01); *H04L 67/14* (2013.01); *H04L 67/148* (2013.01); *H04L 67/24* (2013.01); *H04M 3/42221* (2013.01); *H04M 3/567* (2013.01); *H04M 3/42374* (2013.01); *H04M 2203/305* (2013.01)

(56) References Cited

U.S. PATENT DOCUMENTS

| | | | | |
|---|---|---|---|---|
| 6,353,456 | B1 * | 3/2002 | Sato | H04N 7/152 348/14.08 |
| 6,418,214 | B1 * | 7/2002 | Smythe | H04M 3/56 379/202.01 |
| 6,760,749 | B1 | 7/2004 | Dunlap et al. | |
| 7,099,798 | B2 * | 8/2006 | Yu | G06Q 10/10 702/186 |
| 7,213,051 | B2 | 5/2007 | Zhu et al. | |
| 7,673,246 | B2 * | 3/2010 | Endo | G06T 15/205 715/741 |
| 7,734,802 | B1 * | 6/2010 | Gay | G06F 3/0481 709/231 |
| 7,904,515 | B2 * | 3/2011 | Ambati | G06Q 10/10 709/205 |
| 8,015,246 | B1 * | 9/2011 | Anderson | G06F 3/0481 709/204 |
| 2002/0042293 | A1 * | 4/2002 | Ubale | A63F 13/12 463/9 |
| 2002/0091726 | A1 * | 7/2002 | MacLeod Beck | G06Q 10/06 715/201 |
| 2003/0038805 | A1 * | 2/2003 | Wong | A63F 13/12 345/473 |
| 2003/0163832 | A1 * | 8/2003 | Tsuria | H04N 5/76 725/135 |
| 2004/0107270 | A1 | 6/2004 | Stephens et al. | |
| 2004/0153504 | A1 * | 8/2004 | Hutchinson | G06F 17/30017 709/204 |
| 2004/0199580 | A1 | 10/2004 | Zhakov et al. | |
| 2004/0210827 | A1 * | 10/2004 | Burg | G06Q 10/10 715/205 |
| 2005/0080859 | A1 * | 4/2005 | Lake | H04L 12/581 709/206 |
| 2006/0064342 | A1 | 3/2006 | Frengut et al. | |
| 2006/0089820 | A1 * | 4/2006 | Yu | G06Q 10/10 702/186 |
| 2006/0167662 | A1 * | 7/2006 | Yu | G06Q 10/10 702/186 |
| 2006/0168529 | A1 * | 7/2006 | Rokosz | G06Q 10/10 715/751 |
| 2006/0171515 | A1 | 8/2006 | Hintermeister et al. | |
| 2007/0005691 | A1 | 1/2007 | Pushparaj | |
| 2007/0022159 | A1 * | 1/2007 | Zhu | H04L 12/1831 709/204 |
| 2007/0100939 | A1 * | 5/2007 | Bagley | G06Q 10/10 709/204 |
| 2007/0188901 | A1 | 8/2007 | Heckerman et al. | |
| 2007/0250506 | A1 * | 10/2007 | Stevens | G06Q 10/10 |
| 2007/0300165 | A1 * | 12/2007 | Haveliwala | G06F 3/0482 715/758 |
| 2008/0016156 | A1 * | 1/2008 | Miceli | G06Q 10/10 709/204 |
| 2008/0065717 | A1 * | 3/2008 | Berkin | G10H 1/40 709/203 |
| 2008/0126480 | A1 * | 5/2008 | Hintermeister | G06Q 10/10 709/204 |
| 2008/0168355 | A1 * | 7/2008 | Dunlap | G06F 17/30873 715/733 |
| 2008/0222536 | A1 * | 9/2008 | Berstis | G06Q 10/10 715/753 |
| 2008/0229215 | A1 * | 9/2008 | Baron | G06N 3/006 715/751 |
| 2008/0276174 | A1 * | 11/2008 | Hintermeister | G06Q 10/10 715/720 |
| 2008/0320082 | A1 * | 12/2008 | Kuhlke | H04L 12/1822 709/205 |
| 2009/0006980 | A1 * | 1/2009 | Hawley | G06Q 10/107 715/752 |
| 2009/0113022 | A1 | 4/2009 | Quoc et al. | |
| 2009/0113314 | A1 * | 4/2009 | Dawson | G06F 3/011 715/757 |
| 2009/0177969 | A1 * | 7/2009 | Jones | G06N 3/006 715/730 |
| 2009/0234721 | A1 * | 9/2009 | Bigelow | G06Q 10/10 705/12 |
| 2009/0249076 | A1 * | 10/2009 | Reed | G06Q 30/00 713/181 |
| 2009/0319912 | A1 * | 12/2009 | Serr | H04L 12/1827 715/753 |
| 2009/0327425 | A1 * | 12/2009 | Gudipaty | H04L 65/1093 709/205 |
| 2010/0005394 | A1 * | 1/2010 | Dubnov | G06F 9/4443 715/733 |
| 2010/0149305 | A1 * | 6/2010 | Catchpole | G06K 9/00288 348/14.08 |
| 2011/0029643 | A1 * | 2/2011 | Hjelm | H04H 60/25 709/219 |
| 2011/0113351 | A1 * | 5/2011 | Phillips | G06Q 10/10 715/757 |
| 2011/0282745 | A1 * | 11/2011 | Meoded | G06Q 30/0264 705/14.61 |
| 2011/0320958 | A1 * | 12/2011 | Kashi | G06Q 10/1095 715/751 |
| 2012/0069131 | A1 | 3/2012 | Abelow | |

OTHER PUBLICATIONS

"Web Conferencing Roundup: 9 Tools for Online Meetings", TechSmith Camtasia Studio, <http://webworkerdaily.com/2007/11/12/web-conferencing-roundup/>, 2007, (Author unknown).

"Microsoft Office Live Meeting: Features Make the Most of Web Conferencing", <http://www.intercall.com/services/web-conferencing/live-meeting-features.- php> Nov. 21, 2007, 2 pages, (Author unknown).

* cited by examiner

400

RECORD A MULTIMEDIA CONFERENCE EVENT TO FORM A RECORDED MEETING EVENT
*402*

GENERATE AN ENTITY EVENT LIST FOR THE RECORDED MEETING EVENT
*404*

REPRODUCE THE RECORDED MEETING EVENT
*406*

DISPLAY PRESENCE INFORMATION FOR ONE OR MORE ENTITIES FROM THE ENTITY EVENT LIST WHILE REPRODUCING THE RECORDED MEETING EVENT
*408*

*FIG. 4*

TECHNIQUES TO MANAGE RECORDINGS FOR MULTIMEDIA CONFERENCE EVENTS

CROSS-REFERENCE TO RELATED APPLICATIONS

This application is a continuation of, claims the benefit of and priority to, previously filed U.S. patent application Ser. No. 12/129,694 entitled "Techniques to Manage Recordings for Multimedia Conference Events" filed on May 30, 2008, the subject matter of which is hereby incorporated by reference in its entirety.

BACKGROUND

A multimedia conference system typically allows multiple participants to communicate and share different types of media content in a collaborative and real-time meeting over a network. The multimedia conference system may display different types of media content using various graphical user interface (GUI) windows or views. For example, one GUI view might include video images of participants, another GUI view might include presentation slides, yet another GUI view might include text messages between participants, and so forth. In this manner various geographically disparate participants may interact and communicate information in a virtual meeting environment similar to a physical meeting environment where all the participants are within one room.

Recording is a core component of many multimedia conference systems as it provides asynchronous access to the content and proceedings of a meeting. High level usage scenarios include creating training material or prepared presentations for reuse or broad distribution, preserving material and context for an absent attendee, archiving for offline note-taking or preserving discussions, and archiving content for compliance with various rules and laws. Such usage scenarios are typically driven by the assumption that meeting content and discussions have value beyond the meeting, and therefore could be preserved for access and use afterwards. Consequently, improvements to recording management techniques may enhance the value of recordings for these and other usage scenarios.

SUMMARY

Various embodiments may be generally directed to multimedia conference systems. Some embodiments may be particularly directed to techniques to manage recordings for a multimedia conference event. The multimedia conference event may include multiple participants, some of which may gather in a conference room, while others may participate in the multimedia conference event from a remote location.

In one embodiment, for example, an apparatus may comprise a recording management component operative to manage recording and reproduction operations for a multimedia conference event. The recording management component may comprise an event capture module operative to record a multimedia conference event to form a recorded meeting event. The recording management component may comprise an event entity module communicatively coupled to the event capture module, the event entity module operative to generate an entity event list for the recorded meeting event. The recording management component may comprise an event reproduction module communicatively coupled to the event entity module, the event reproduction module operative to reproduce the recorded meeting event. The recording management component may comprise an event interface module communicatively coupled to the event reproduction module, the event interface module operative to display presence information for one or more entities from the entity event list while reproducing the recorded meeting event. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 illustrates an embodiment of a logic flow.

DETAILED DESCRIPTION

Figure 1:
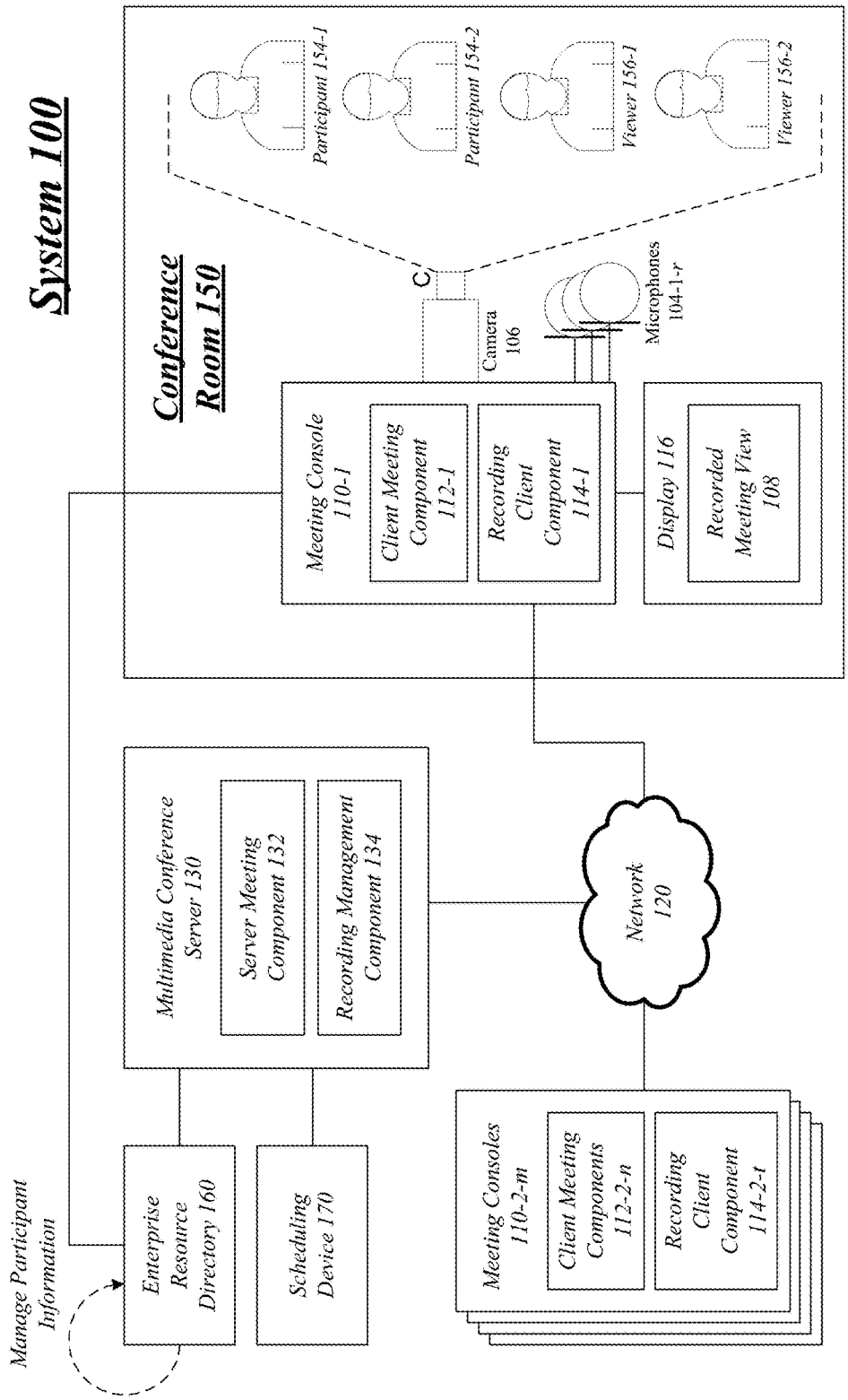
FIG. 1 illustrates an embodiment of a multimedia conference system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to multimedia conference systems arranged to provide meeting and collaboration services to multiple participants over a network. Some multimedia conference systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash. Other multimedia conference systems may be designed to operate for a private network, business, organization, or enterprise, and may utilize a multimedia conference server such as MICROSOFT OFFICE COMMUNICATIONS SERVER made by Microsoft Corporation, Redmond, Wash. It may be appreciated, however, that implementations are not limited to these examples.

A multimedia conference system may include, among other network elements, a multimedia conference server or other processing device arranged to provide web conferencing services. For example, a multimedia conference server may include, among other server elements, a server meeting component operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event," "multimedia event" or "multimedia conference event."

In one embodiment, the multimedia conference system may further include one or more computing devices implemented as meeting consoles. Each meeting console may be arranged to participate in a multimedia event by connecting to the multimedia conference server. Different types of media information from the various meeting consoles may be received by the multimedia conference server during the multimedia event, which in turn distributes the media information to some or all of the other meeting consoles participating in the multimedia event As such, any given meeting console may have a display with multiple media content views of different types of media content. In this manner various geographically disparate participants may interact and communicate information in a virtual meeting environment similar to a physical meeting environment where all the participants are within one room.

In a virtual meeting environment, it may be difficult to identify the various participants of a meeting. Participants in a multimedia conference event are typically listed in a GUI view with a participant roster. The participant roster may have some identifying information for each participant, including a name, location, image, title, and so forth. The participants and identifying information for the participant roster is typically derived from a meeting console used to join the multimedia conference event. For example, a participant typically uses a meeting console to join a virtual meeting room for a multimedia conference event. Prior to joining, the participant provides various types of identifying information to perform authentication operations with the multimedia conference server. Once the multimedia conference server authenticates the participant, the participant is allowed access to the virtual meeting room, and the multimedia conference server adds the identifying information to the participant roster.

Recording is a core component of many multimedia conference systems as it provides asynchronous access to the content and proceedings of a meeting. High level usage scenarios include creating training material or prepared presentations for reuse or broad distribution, preserving material and context for an absent attendee, archiving for offline note-taking or preserving discussions, and archiving content for compliance with various rules and laws. Such usage scenarios are typically driven by the assumption that meeting content and discussions have value beyond the meeting, and therefore could be preserved for access and use afterwards.

Conventional recording management techniques, however, are unsatisfactory for a number of reasons. Recorded meeting events are typically considered to be merely a record of past multimedia conference events. As such, the recorded meeting events are viewed as static files that do not need to be changed or modified once the multimedia conference event that is the subject of the recording has ended. Further, playback sessions of the recorded meeting events are typically non-interactive events where the viewer passively watches or consumes the recorded meeting event. For example, a viewer may have questions about the subject matter discussed during the multimedia conference event. In this case, the viewer may have to manually search for identifying information for a participant such as a presenter either by watching the recorded meeting contact and writing down identifying information from the participant roster, or performing offline searches. The viewer may then need to locate contact information for the participant, attempt to contact the participant to determine availability, and establish a dialog with the participant through various types of communications channels (e.g., telephone, email, chat, etc.). This can be a tedious and cumbersome process that some viewers may consider not worth performing to simply ask a question of the participant. Furthermore, although the viewer may have access to limited playback controls, such as fast forward, reverse, pause, and so forth, a recorded meeting event is typically difficult to manipulate and modify by the viewers. For example, the recorded meeting event may not be capable of storing any information or events that occur after the multimedia conference event has been recorded, such as viewing activities and discussions.

To solve these and other problems, the embodiments are generally directed to various enhanced recording management techniques. Some embodiments are particularly directed to interactive playback techniques to dynamically view a recorded meeting event and store post-recording events with the recorded meeting event. In one embodiment, for example, an apparatus such as a multimedia conference server may include a recording management component arranged to provide enhanced recording, access and playback operations for a multimedia conference event. The recording management component may allow a viewer to dynamically interact with the viewing environment, such as indicating when participants that are recorded in the recorded meeting event are currently online and available for communication via a convenient communication channel, such as instant messaging. This may be accomplished, for example, by retrieving and publishing presence information for the original participants of a recorded meeting event, such as presenters and attendees. Furthermore, the recording management component may provide presence information for previous and current viewers of a recorded meeting event, thereby allowing a dynamic viewing environment where the viewers can interact with each other to discuss the recorded meeting event. The recording management component may store such communications with the recorded meeting event, thereby ensuring that the recorded meeting event is kept current with post-recording activities. As a result, viewers and participants may more effectively utilize recorded meeting events in a dynamic, robust and interactive manner, thereby enhancing use of the myriad number of recorded meeting events typically maintained by an enterprise, educational institution, or other organization.

FIG. 1 illustrates a block diagram for a multimedia conference system 100. Multimedia conference system 100 may represent a general system architecture suitable for implementing various embodiments. Multimedia conference system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conference system 100 as shown in FIG. 1 has a limited number of elements in a certain topology, it may be appreciated that multimedia conference system 100 may include more or less elements in alternate topologies as desired for a given implementation. The embodiments are not limited in this context.

In various embodiments, the multimedia conference system 100 may comprise, or form part of, a wired communications system, a wireless communications system, or a combination of both. For example, the multimedia conference system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The multimedia conference system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, the multimedia conference system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Media information may sometimes be referred to as "media content" as well. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conference system 100 may include a multimedia conference server 130. The multimedia conference server 130 may comprise any logical or physical entity that is arranged to establish, manage or control a multimedia conference call between meeting consoles 110-1-$m$ over a network 120. Network 120 may comprise, for example, a packet-switched network, a circuit-switched network, or a combination of both. In various embodiments, the multimedia conference server 130 may comprise or be implemented as any processing or computing device, such as a computer, a server, a server array or server farm, a work station, a mini-computer, a main frame computer, a supercomputer, and so forth. The multimedia conference server 130 may comprise or implement a general or specific computing architecture suitable for communicating and processing multimedia information. In one embodiment, for example, the multimedia conference server 130 may be implemented using a computing architecture as described with reference to FIG. 5. Examples for the multimedia conference server 130 may include without limitation a MICROSOFT OFFICE COMMUNICATIONS SERVER, a MICROSOFT OFFICE LIVE MEETING server, and so forth.

A specific implementation for the multimedia conference server 130 may vary depending upon a set of communication protocols or standards to be used for the multimedia conference server 130. In one example, the multimedia conference server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conference server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conference server 130, however, and still fall within the scope of the embodiments.

In general operation, multimedia conference system 100 may be used for multimedia conference calls. Multimedia conference calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to a Public Switched Telephone Network (PSTN) via one or more suitable VoIP gateways arranged to convert between circuit-switched information and packet information.

To establish a multimedia conference call over the packet network 120, each meeting console 110-1-$m$ may connect to multimedia conference server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, the multimedia conference server 130 may establish, manage and control a multimedia conference call between meeting consoles 110-1-$m$. In some embodiments, the multimedia conference call may comprise a live web-based conference call using a web conferencing application that provides full collaboration capabilities. The multimedia conference server 130 operates as a central server that controls and distributes media information in the conference. It receives media information from various meeting consoles 110-1-$m$, performs mixing operations for the multiple types of media information, and forwards the media information to some or all of the other participants. One or more of the meeting consoles 110-1-$m$ may join a conference by connecting to the multimedia conference server 130. The multimedia conference server 130 may implement various admission control techniques to authenticate and add meeting consoles 110-1-$m$ in a secure and controlled manner.

In various embodiments, the multimedia conference system 100 may include one or more computing devices implemented as meeting consoles 110-1-$m$ to connect to the multimedia conference server 130 over one or more communications connections via the network 120. For example, a computing device may implement a client application that may host multiple meeting consoles each representing a separate conference at the same time. Similarly, the client application may receive multiple audio, video and data streams. For example, video streams from all or a subset of the participants may be displayed as a mosaic on the participant's display with a top window with video for the current active speaker, and a panoramic view of the other participants in other windows.

The meeting consoles 110-1-$m$ may comprise any logical or physical entity that is arranged to participate or engage in a multimedia conference call managed by the multimedia conference server 130. The meeting consoles 110-1-$m$ may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of the meeting consoles 110-1-$m$ may include a telephone, a VoIP or VOP telephone, a packet telephone designed to operate on the PSTN, an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, the meeting consoles 110-1-$m$ may be implemented using a general or specific computing architecture similar to the computing architecture described with reference to FIG. 5.

The meeting consoles 110-1-$m$ may comprise or implement respective client meeting components 112-1-$n$. The client meeting components 112-1-$n$ may be designed to interoperate with the server meeting component 132 of the multimedia conference server 130 to establish, manage or control a multimedia conference event. For example, the client meeting components 112-1-$n$ may comprise or implement the appropriate application programs and user interface controls to allow the respective meeting consoles 110-1-$m$ to participate in a web conference facilitated by the multimedia conference server 130. This may include input equipment (e.g., video camera, microphone, keyboard, mouse, controller, etc.) to capture media information provided by the operator of a meeting console 110-1-$m$, and output equipment (e.g., display, speaker, etc.) to reproduce media information by the operators of other meeting consoles 110-1-$m$. Examples for client meeting components 112-1-$n$ may include without limitation a MICROSOFT OFFICE COMMUNICATOR or the MICROSOFT OFFICE LIVE MEETING Windows Based Meeting Console, and so forth.

As shown in the illustrated embodiment of FIG. 1, the multimedia conference system 100 may include a conference room 150. An enterprise or business typically utilizes conference rooms to hold meetings. Such meetings include multimedia conference events having participants located internal to the conference room 150, and remote participants located external to the conference room 150. The conference room 150 may have various computing and communications resources available to support multimedia conference events, and provide multimedia information between one or more remote meeting consoles 110-2-$m$ and the local meeting console 110-1. For example, the conference room 150 may include a local meeting console 110-1 located internal to the conference room 150.

The local meeting console 110-1 may be connected to various multimedia input devices and/or multimedia output devices capable of capturing, communicating or reproducing multimedia information. The multimedia input devices may comprise any logical or physical device arranged to capture or receive as input multimedia information from operators within the conference room 150, including audio input devices, video input devices, image input devices, text input devices, and other multimedia input equipment. Examples of multimedia input devices may include without limitation video cameras, microphones, microphone arrays, conference telephones, whiteboards, interactive whiteboards, voice-to-text components, text-to-voice components, voice recognition systems, pointing devices, keyboards, touchscreens, tablet computers, handwriting recognition devices, and so forth. An example of a video camera may include a ringcam, such as the MICROSOFT ROUNDTABLE made by Microsoft Corporation, Redmond, Wash. The MICROSOFT ROUNDTABLE is a videoconferencing device with a 360 degree camera that provides remote meeting participants a panoramic video of everyone sitting around a conference table. The multimedia output devices may comprise any logical or physical device arranged to reproduce or display as output multimedia information from operators of the remote meeting consoles 110-2-$m$, including audio output devices, video output devices, image output devices, text input devices, and other multimedia output equipment. Examples of multimedia output devices may include without limitation electronic displays, video projectors, speakers, vibrating units, printers, facsimile machines, and so forth.

The local meeting console 110-1 in the conference room 150 may include various multimedia input devices arranged to capture media content from the conference room 150 including the participants 154-1-$p$, and stream the media content to the multimedia conference server 130. In the illustrated embodiment shown in FIG. 1, the local meeting console 110-1 includes a video camera 106 and an array of microphones 104-1-$e$. The video camera 106 may capture video content including video content of the participants 154-1-$p$ present in the conference room 150, and stream the video content to the multimedia conference server 130 via the local meeting console 110-1. Similarly, the array of microphones 104-1-*e* may capture audio content including audio content from the participants 154-1-*p* present in the conference room 150, and stream the audio content to the multimedia conference server 130 via the local meeting console 110-1. The local meeting console may also include various media output devices, such as a display 116 or video projector, to show one or more GUI views with video content or audio content from all the participants using the meeting consoles 110-1-*m* received via the multimedia conference server 130.

The meeting consoles 110-1-*m* and the multimedia conference server 130 may communicate media information and control information utilizing various media connections established for a given multimedia conference event. The media connections may be established using various VoIP signaling protocols, such as the SIP series of protocols. The SIP series of protocols are application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP is designed as part of the overall IETF multimedia data and control architecture currently incorporating protocols such as the resource reservation protocol (RSVP) (IEEE RFC 2205) for reserving network resources, the real-time transport protocol (RTP) (IEEE RFC 1889) for transporting real-time data and providing Quality-of-Service (QOS) feedback, the real-time streaming protocol (RTSP) (IEEE RFC 2326) for controlling delivery of streaming media, the session announcement protocol (SAP) for advertising multimedia sessions via multicast, the session description protocol (SDP) (IEEE RFC 2327) for describing multimedia sessions, and others. For example, the meeting consoles 110-1-*m* may use SIP as a signaling channel to setup the media connections, and RTP as a media channel to transport media information over the media connections.

In general operation, a schedule device 170 may be used to generate a multimedia conference event reservation for the multimedia conference system 100. The scheduling device 170 may comprise, for example, a computing device having the appropriate hardware and software for scheduling multimedia conference events. For example, the scheduling device 170 may comprise a computer utilizing MICROSOFT OFFICE OUTLOOK® application software, made by Microsoft Corporation, Redmond, Wash. The MICROSOFT OFFICE OUTLOOK application software comprises messaging and collaboration client software that may be used to schedule a multimedia conference event. An operator may use MICROSOFT OFFICE OUTLOOK to convert a schedule request to a MICROSOFT OFFICE LIVE MEETING event that is sent to a list of meeting invitees. The schedule request may include a hyperlink to a virtual room for a multimedia conference event. An invitee may click on the hyperlink, and the meeting console 110-1-*m* launches a web browser, connects to the multimedia conference server 130, and joins the virtual room. Once there, the participants can present a slide presentation, annotate documents or brainstorm on the built in whiteboard, among other tools.

An operator may use the scheduling device 170 to generate a multimedia conference event reservation for a multimedia conference event. The multimedia conference event reservation may include a list of meeting invitees for the multimedia conference event. The meeting invitee list may comprise a list of individuals invited to a multimedia conference event. In some cases, the meeting invitee list may only include those individuals invited and accepted for the multimedia event. A client application, such as a mail client for Microsoft Outlook, forwards the reservation request to the multimedia conference server 130. The multimedia conference server 130 may receive the multimedia conference event reservation, and retrieve the list of meeting invitees and associated information for the meeting invitees from a network device, such as an enterprise resource directory 160.

The enterprise resource directory 160 may comprise a network device that publishes a public directory of operators and/or network resources. A common example of network resources published by the enterprise resource directory 160 includes network printers. In one embodiment, for example, the enterprise resource directory 160 may be implemented as a MICROSOFT ACTIVE DIRECTORY®. Active Directory is an implementation of lightweight directory access protocol (LDAP) directory services to provide central authentication and authorization services for network computers. Active Directory also allows administrators to assign policies, deploy software, and apply important updates to an organization. Active Directory stores information and settings in a central database. Active Directory networks can vary from a small installation with a few hundred objects, to a large installation with millions of objects.

In various embodiments, the enterprise resource directory 160 may include identifying information for the various meeting invitees to a multimedia conference event. The identifying information may include any type of information capable of uniquely identifying each of the meeting invitees. For example, the identifying information may include without limitation a name, a location, contact information, account numbers, professional information, organizational information (e.g., a title), personal information, connection information, presence information, a network address, a media access control (MAC) address, an Internet Protocol (IP) address, a telephone number, an email address, a protocol address (e.g., SIP address), equipment identifiers, hardware configurations, software configurations, wired interfaces, wireless interfaces, supported protocols, presence information, and other desired information.

The multimedia conference server 130 may receive the multimedia conference event reservation, including the list of meeting invitees, and retrieves the corresponding identifying information from the enterprise resource directory 160. The multimedia conference server 130 may use the list of meeting invitees and corresponding identifying information to assist in identifying the participants to a multimedia conference event. The multimedia conference server 130 may also store and use the identifying information for implementing various recording management techniques.

Once a multimedia conference event is initiated, the one or more meeting consoles 110-1-*m* may receive media content such as audio/visual (A/V) data from any local media source (e.g., a camera and/or microphone) and can send this media content over the network 120. In one embodiment, there is a distributed object (DO) layer which abstracts signaling stack transactions between the meeting consoles 110-1-*m* and the multimedia conference server 130. Similarly, conference control and media transactions between the meeting consoles 110-1-*m* and the multimedia conference server 130 may be abstracted, as will be known by those skilled in the art. The meeting components 112, 134 may be operative for setting up and executing a web meeting, which includes sending and receiving meeting data, such as video and audio media content. Various user interface (UI) control modules may be implemented by the client meeting components 112-1-$n$ at the meeting consoles 110-1-$m$ to allow set up, control and display operations of the system and data. The client meeting components 112-1-$n$ can also process integrated audio such as VOIP signals and PSTN signals.

The client meeting components 112-1-$n$ receive media content from any media source, such as a conventional web camera 106 and microphones 104-1-$e$. The client meeting components 112-1-$n$ render the media content on the display 116 with integrated or separate speakers. The client meeting components 112-1-$n$ also have various input devices such as a keyboard or mouse. The client meeting components 112-1-$n$ also have a module for receiving and storing various real-time communication (RTC) and meeting media and data transactions and a signaling stack for communicating with the server meeting component 132 of the multimedia conference server 130. In one embodiment, the meeting components 112, 132 communicate via a SIP protocol and an access proxy which interfaces with the signaling stack at the server meeting component 132. As previously described, SIP is an application-layer control (signaling) protocol for creating, modifying, and terminating sessions with one or more participants. These sessions typically include Internet telephone calls, multimedia distribution, and multimedia conferences. It is widely used as signaling protocol for VoIP, along with H.323 and others. Alternately the communication between the meeting components 112, 132 may take place via a secure standard or proprietary protocol such as the Persistent Shared Object Model (PSOM) protocol, although any other protocol for sharing data could be employed.

The multimedia conference server 130 may include a recording management component 134, and the meeting consoles 110-1-$m$ may each optionally implement a respective recording client component 114-1-$t$. The recording management component 134 and recording client components 114-1-$t$ may operate alone or collectively to implement various enhanced recording management techniques. For example, the recording management component 134 may be arranged for server-side operations while the recording client components 114-1-$t$ may be arranged for client-side operations. Examples of server-side operations may include without limitation recording, storing and reproducing a multimedia conference event. In the latter case, for example, the recording management component 134 may stream selected recorded meeting events for a viewer 156-1-$r$ in the conference room 150 (or elsewhere). This may be suitable when the viewer 156-1-$r$ is online with the multimedia conference server 130. Examples of client-side operations may include without limitation recording, storing, retrieving recorded meeting events from the multimedia conference server 130, and reproducing recorded meeting events. In the latter case, for example, the recording client component 114-1-$t$ may download selected recorded meeting events for a viewer 156-1-$r$ for viewing at a later time. This may be suitable when the viewer 156-1-$r$ is offline with the multimedia conference server 130, such as when traveling. Although some embodiments may describe the recording management techniques as implemented by the recording management component 134 of the multimedia conference server 130, it may be appreciated that some or all of the recording management techniques may be implemented by one or more of the recording client components 114-2-$t$. The embodiments are not limited in this context.

More particularly, the recording management component 134 and/or the recording client components 114-2-$t$ implement various interactive playback techniques to dynamically view a recorded meeting event and store post-recording events with the recorded meeting event. The recording management component 134 is arranged to provide enhanced recording, access and playback operations for a multimedia conference event. The recording management component 134 may allow a viewer to dynamically interact with the viewing environment, such as indicating when participants 154-1-$p$ that are recorded in the recorded meeting event are currently online and available for communication via a convenient communication channel, such as instant messaging or chat techniques. This may be accomplished, for example, by retrieving and publishing presence information for the original participants 154-1-$p$ of a recorded meeting event. The participants 154-1-$p$ may include, for example, presenters and attendees. Furthermore, the recording management component 134 may provide presence information for previous and current viewers 156-1-$r$ of a recorded meeting event, thereby allowing a dynamic viewing environment where the viewers 156-1-$r$ can interact with each other to discuss the recorded meeting event. The recording management component may store such communications with the recorded meeting event in a single recording file, or in a corresponding supplemental recording file, thereby ensuring that the recorded meeting event is kept current with post-recording activities. As a result, viewers 156-1-$r$ and participants 154-1-$p$ may more effectively utilize recorded meeting events in a dynamic, robust and interactive manner, thereby enhancing use of the myriad number of recorded meeting events typically maintained by an enterprise, educational institution, or other organization. The recording management component 134 may be described in more detail with reference to FIG. 2.

Figure 2:
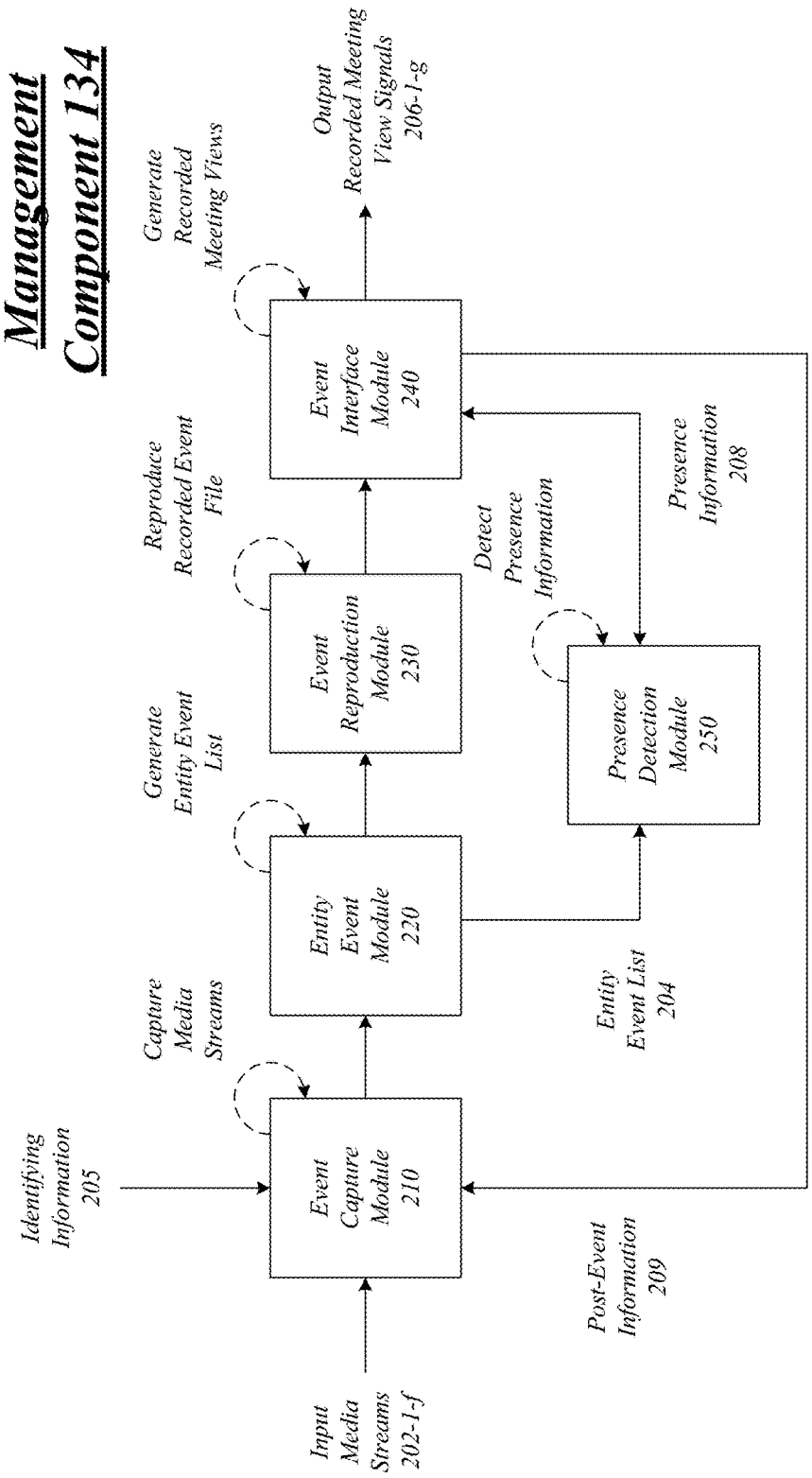
FIG. 2 illustrates an embodiment of a recording management component.

FIG. 2 illustrates a block diagram for the recording management component 134. The recording management component 134 may comprise multiple modules. The modules may be implemented using hardware elements, software elements, or a combination of hardware elements and software elements. Although the recording management component 134 as shown in FIG. 2 has a limited number of elements in a certain topology, it may be appreciated that the recording management component 134 may include more or less elements in alternate topologies as desired for a given implementation. The embodiments are not limited in this context.

In general, the recording management component 134 implements enhanced interactive recording, access and playback techniques. In particular, the recording management component 134 displays online presence information for the original participants 154-1-$p$ (e.g., presenters and attendees) in a recorded meeting event, as well as those viewers 156-1-$r$ who watch the recorded meeting event. The online presence information may be used to initiate communications with the participants 154-1-$p$ and/or the viewers 156-1-$r$ via a convenient communications technique, such as an instant messaging or group chat session.

Furthermore, the recording management component 134 may update recorded meeting events with dynamic and new post-event information 209, such as new question and answer (Q&A) scripts, chat sessions, viewer statistics, viewer information, and so forth. Recorded meeting events can include more than a capture of what happened during a multimedia conference event to enable potential scenarios such as Q&A clarifications while viewing recordings. Such use scenarios while recording can also be captured as additions to a new updated version of a recorded meeting event thereby making it richer and more robust. Examples of post-event information 209 may include without limitation: (1) dynamic information about presence information for participants 154-1-$p$ and viewers 156-1-$r$; (2) communications performed in the context of a recording, such as Q&A, chat messages, and so forth; (3) new Q&A posted by viewers 156-1-$r$ in the context of a recording; (4) updated viewer statistics and contact details; and so forth.

In the illustrated embodiment shown in FIG. 2, the recording management component 134 includes an event capture module 210 operative to record a multimedia conference event to form a recorded meeting event. Recorded meeting events may be defined by a spectrum ranging from as-is recordings to fully scripted recordings. In as-is recordings, data is preserved as is with no editing or broad distribution. This type of recording is typically used for preserving important conversations, offline note-taking or for legal compliance in corporate environments. This data is hardly distributed, if at all and has low subsequent usage. Fully scripted recordings, on the other hand, may use the recording process only as a first step or a baseline starting point. The data is then edited (sometimes iteratively) to create a fully polished presentation or training material that is broadly distributed. Everything else in web conferencing recording, such as the typical missed meeting scenario, falls in between.

The event capture module 210 may be arranged to record or capture media content from a multimedia conference event, such as a web meeting, conference or training session. The event capture module 210 receives various input media streams 202-1-$f$ from the various meeting consoles 110-1-$m$. The media streams 202-1-$f$ may include, among other information, meeting data to include meeting content (e.g., presentations, images, spreadsheets, documents), generated data content (annotations, whiteboard, text slides, questions and answers (Q&A), shared notes and so on), audio and video from the meeting, meeting attendee information, and so forth. In one embodiment, for example, the event capture module 210 may record event communications between participants of the multimedia conference event. The event communications may include Q&A, presentation materials, and other shared notes communicated between the participants 154-1-$p$ during the multimedia conference event.

The event capture module 210 may support various recording output formats, including a screen capture (or scraping format) and per-audio slide format, among others. The screen scraping format encodes all data and audio in the meeting to a single video file for playback from a streaming server or a local directory. This is the most widely used format employed today. Basic per-slide audio format is a low fidelity format that converts the final view of most slide types into static images with audio narration. Additionally or alternatively, the event capture module 210 may further include multi-track support wherein tracks in different formats are available for selection. Each track is independent from the other tracks and operates in parallel. That is, each of the data sources (e.g., the audio, video or meeting content in various formats for the meeting or any sub-meeting) is considered as a different track which can be separately replayed and edited. The event capture module 210 is capable of capturing panoramic video if one of the inputs is from the omni-directional camera 106 and the microphone array 104-1-$e$.

In addition to performing event recording operations, the event capture module 210 may also perform publishing operations for the recorded meeting events. In one embodiment, for example, the event capture module 210 may convert the captured data into a universal format that can be rendered readily by the playback module. One embodiment of the interactive recording, access and playback technique employs a high fidelity presentation (HFP) format publisher. The HFP publisher uses the HFP format, which is discussed in greater detail below. The publishing process automatically generates data in a format that an end user can use with only a browser and a media player. The event capture module 210 may also perform transcoding operations to convert certain captured data formats into different data formats suitable for publishing if necessary. The publishing process further includes publishing the data in a universal format and produces the multiple indices employed by the event capture module 210. It also is responsible for panoramic image production. Lastly, the publishing process includes post-processing operations employed in post processing data to clean up temporary data files.

In the illustrated embodiment shown in FIG. 2, the event capture module 210 may be implemented as part of the recording management component 134 of the multimedia conference server 130. In this case, the event capture module 210 may perform server-side recording operations for a multimedia conference event. Server-side recording is a recording model where media content is captured and published on the multimedia conference server 130, thereby eliminating the need for higher system requirements on the meeting consoles 110-1-$m$ and know-how of an operator. Due to the central nature of server-side recording, it is a typically a shared experience. It is the single recording of the multimedia conference event from the perspective of the multimedia conference server 130. Hence, when one presenter changes the recording controls, all presenters will see the change. There is typically one server-side recording instance of a multimedia conference event at any given time.

Additionally or alternatively, the event capture module 210 may be implemented as part of the recording client component 114. In this case, the event capture module 210 may perform client-side recording operations. Client-side recording is a recording model where media content is captured and published on a meeting console 110-1-$m$. It gives the operator more control over his or her data, since no recordings data is preserved on the multimedia conference server 130. Due to the client centric nature of client-side recording, however, it is typically an individual experience. Each user's recording is separate and unique, and is a reflection of what that user desires to capture in the meeting. Any changes to recording settings, therefore, are applicable only on that client and do not impact any other user.

The event capture module 210 may receive various types of information to store with a recorded meeting event. For example, the event capture module 210 may receive identifying information 205 sometime before, during or after recording a multimedia conference event, and store the identifying information 205 with the recorded meeting event. In another example, the event capture module 210 may receive post-event information 209 after recording a multimedia conference event, and store the post-event information with the recorded meeting event.

In one embodiment, for example, the event capture module 210 may receive identifying information 205, such as participant contact information and viewer contact information. As previously described, the enterprise resource directory 160 may store various types of identifying information for the various meeting invitees to a multimedia conference event, including information capable of uniquely identifying each of the meeting invitees, contact information, and presence information. The event capture module 210 may receive identifying information 205 from the enterprise resource directory 160, and store the participant contact information and viewer contact information with the recorded meeting event. In this manner, the participant contact information and viewer contact information may be readily available when viewing the recorded meeting event at a later time. In one embodiment, for example, the contact information may comprise a SIP uniform resource identifier (URI).

In one embodiment, for example, the event capture module 210 may receive and store post-event information 209. The post-event information 209 may comprise any information relating to a recorded meeting event that is performed after the recorded meeting event was generated. In one embodiment, for example, the post-event information 209 may comprise various communications or comments from individuals participating in the multimedia conference event or viewers of the recorded meeting event, such as participant-participant communications, participant-viewer communications, viewer-viewer communications, and so forth. Typically the post-event information 209 is generated when a viewer 156-1-r is viewing the recorded meeting event, although viewing activity is not necessarily needed to generate post-event information 209. For example, the post-event information 209 may include any post-processing activities, metadata assignments, classification information, and so forth.

In one embodiment, for example, the post-event information 209 may comprise participant-viewer communications. The event capture module 210 may record post-event communications made between a participant 154-1-p in the multimedia conference event and a viewer 156-1-r of the recorded meeting event. For example, while a viewer 156-1-r is viewing a recorded meeting event, the recording management component 134 may publish or display participant presence information for the participants 154-1-p. The viewer 156-1-r may communicate with one or more participants 154-1-p. When this occurs, the event capture module 210 may record the post-event communications with the recorded meeting event.

In one embodiment, for example, the post-event information 209 may comprise viewer-viewer communications. The event capture module 210 may record post-event communications between viewers 156-1-r of the recorded meeting event. Similar to the participant-viewer communications, the recording management component 134 may publish or display viewer presence information for the viewers 156-1-r. the viewers 156-1-r may communicate with each other while viewing the recorded meeting content. When this occurs, the event capture module 210 may record the post-event communications with the recorded meeting event.

The recording management component 134 may comprise an event entity module 220 communicatively coupled to the event capture module 210. The event entity module 220 may be operative to generate an entity event list 204 for the recorded meeting event. The entity event list 204 may include participant identifying information for participants of the multimedia conference event, and viewer identifying information for viewers of the recorded meeting event. The entity event list 204 may comprise a list of participants 154-1-p and viewers 156-1-r, with the list including a unique identifier for each person on the list and contact information. In some respects, the entity event list may be analogous to a "buddy list" or "recording buddy list," where a person has convenient and easy access to a list of relevant entities related to a given recorded meeting event.

The recording management component 134 may comprise an event reproduction module 230 communicatively coupled to the event entity module 220. The event reproduction module 230 may be operative to reproduce the recorded meeting event. The event reproduction module 230 may perform playback operations for recorded meeting events captured and updated by the event capture module 210. The event reproduction module 230 can include a web playback application for playing back data using a web-browser and a playback rendering engine for rendering the data. In one embodiment, the playback functionality may employ the HFP format for playback operations. The event reproduction module 230 can include synchronized audio and video with proactive and adaptive degradation to accommodate lower bandwidth networks. The playback controls can include start, stop, pause, resume, fast forward and rewind. Additionally, the playback functionality can provide data indexing using final image thumbnails. The playback functionality further can include Resizable Playback with multiple preset views (turn on/off Speaker Video, Notes, Q&A etc.). Additionally or alternatively, the playback functionality can provide a single fixed view with automatic rearrangement for unavailable streams. The playback can also include active speaker indexing. For fast playback (greater than 1× the recording speed) the event reproduction module 230 can correct for audio pitch.

The recording management component 134 may comprise a presence detection module 250 communicatively coupled to the event interface module 240 and the entity event module 220. The presence detection module 250 may be operative to dynamically detect participant presence information and viewer presence information for the various entities listed by the entity event list 204 while reproducing the recorded meeting event. The presence detection module 250 may retrieve presence information for the various entities from a number of different network sources, one of which comprise the enterprise resource directory 160.

The presence detection module 250 may receive the entity event list 204 in a number of different ways. In one embodiment, for example, the presence detection module 250 may receive the entity event list 204 directly from the entity event module 220. This may occur, for example, whenever the event reproduction module 230 is reproducing the recorded meeting event. Additionally or alternatively, the presence detection module 250 may receive the entity event list 204 from the recorded meeting event. For example, the entity event module 220 may store the entity event list 204 as part of the recorded meeting event. The presence detection module 250 and/or the event reproduction module 230 may extract the entity event list 204 from the recorded meeting event file. In some respects, the recorded meeting event file may operate more than just a repository for stored media content, but also data and logic that causes the recorded meeting event file to operate as a small or compact self-executing application program. The embedded scripts may execute various APIs to extract the entity event list 204 from the recorded meeting event file, and forward the extracted entity event list 204 to a communications interface such as MICROSOFT OFFICE COMMUNICATOR or some other messenger to display the various entities provided by the extracted entity event list 204. The embedded scripts may also extract this information from another network device, such as the multimedia conference server 130 or the enterprise resource directory 160 which maintains this type of information for a SIP URI.

The recording management component 134 may comprise an event interface module 240 communicatively coupled to the event reproduction module 230 and the presence detection module 250. The event interface module 240 may generate various GUI information, elements and views for interfacing with an operator of a meeting console 110-1-*m*, such as a viewer 156-1-*r*. The event interface module 240 may be operative to display presence information for one or more entities from the entity event list 204 while the event reproduction module 230 is reproducing a recorded meeting event.

The event interface module 240 may be operative to generate a GUI view to display participant presence information and viewer presence information received from the presence detection module 250 for entities listed on the entity event list 204 while the event reproduction module 230 reproduces a recorded meeting event for viewers 156-1-*r*.

In one embodiment, the event interface module 240 may generate a recorded meeting view 108 to display viewer presence information for current viewers 156-1-*r* of a recorded meeting event. For example, the presence detection module 250 may generate viewer presence information for all viewers 156-1-*r* that are currently watching a recorded meeting event at the same time. This allows the viewers 156-1-*r* to interact with each other in real-time in a similar context experience, that is, while simultaneously viewing the recorded meeting event.

In one embodiment, the event interface module 240 may generate a recorded meeting view 108 to display viewer presence information for previous viewers 156-1-*r* of a recorded meeting event. For example, the presence detection module 250 may generate viewer presence information for all viewers 156-1-*r* that are currently watching a recorded meeting event at the same time, and any previous viewers 156-1-*r* that have viewed the recorded meeting event in the past at an earlier time. This allows the viewers 156-1-*r* to interact with each other in real-time in a similar context experience, while also gaining access to previous viewers 156-1-*r* that may have previously viewed the recorded meeting content and may have additional information or insights about the recorded meeting event developed in the intervening time interval.

The event interface module 240 may receive notification from the event reproduction module 230 that a recorded meeting event is being played or reproduced for one or more meeting consoles 110-1-*m*, and notify the presence detection module 250 to begin retrieving presence information for the entities on the entity event list 204 from the enterprise resource directory 160. The event interface module 240 may then generate the recorded meeting view 108, and output recorded meeting view signals 206-1-*g* for rendering by the display sub-system of the meeting console 110-1-*m*. An example for the recorded meeting view 108 may be described with reference to FIG. 3.

Figure 3:
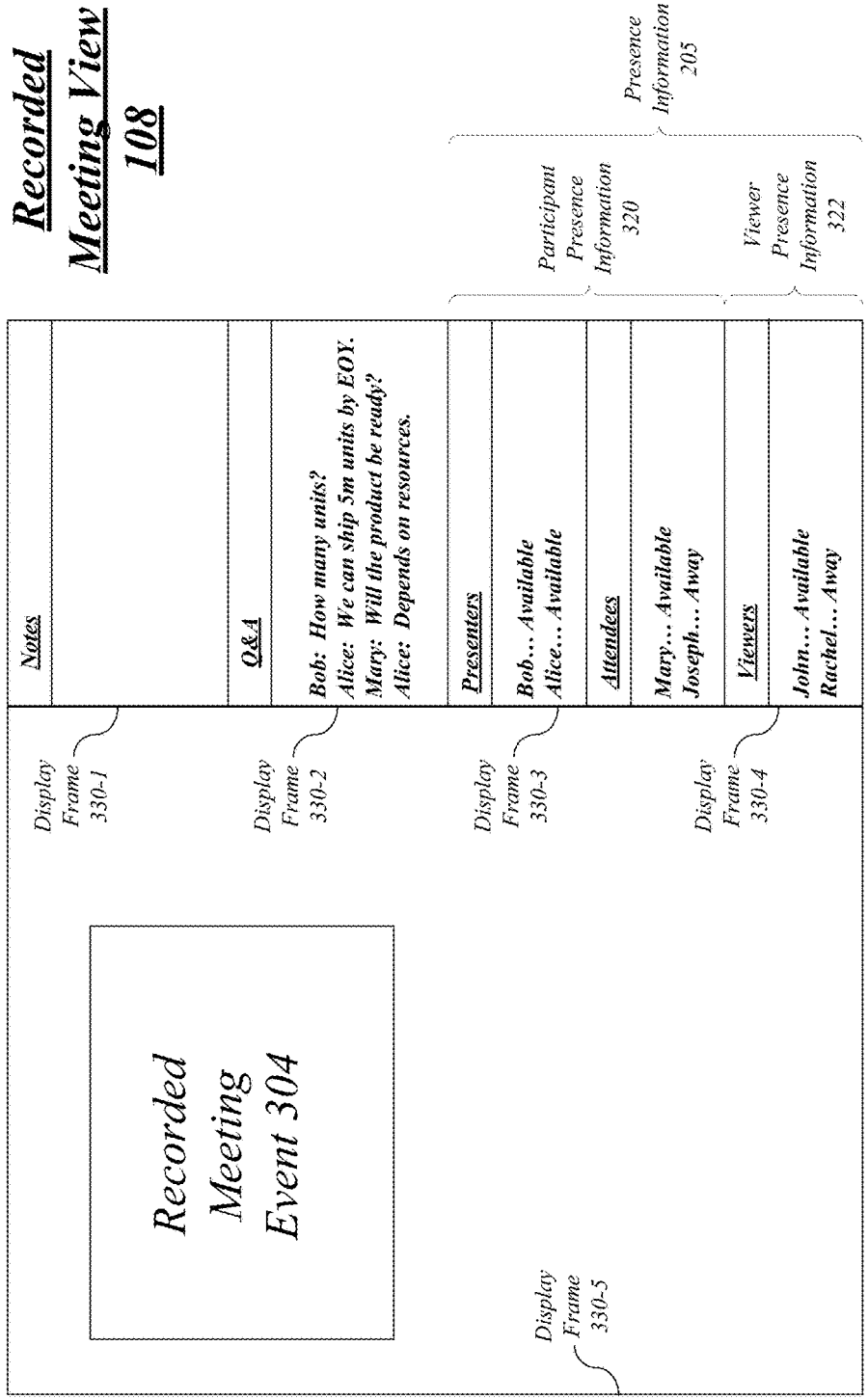
FIG. 3 illustrates an embodiment of a recorded meeting view.

FIG. 3 illustrates a more detailed diagram of the recorded meeting view 108. The recorded meeting view 108 may comprise various display frames 330-1-*a* arranged in a certain mosaic or display pattern for presentation to a viewer 156-1-*r*, such as an operator of a meeting console 110-1-*m*. Each display frame 330-1-*a* is designed to render or display multimedia content from the media streams 202-1-*f*, such as video content and/or audio content from a corresponding media stream 202-1-*f* mapped to a given display frame 330-1-*a*.

In the illustrated embodiment shown in FIG. 3, for example, the recorded meeting view 108 may include a display frame 330-5 comprising a main viewing region to display a recorded meeting event 304 reproduced by the event reproduction module 230. Further, the recorded meeting view 108 may include the display frames 330-1 through 330-4 to render or display various types of GUI elements, such as participant contact information and presence information, viewer contact information and presence information, Q&A sessions, notes and so forth. It may be appreciated that the recorded meeting view 108 may include more or less display frames 330-1-*a* of varying sizes and alternate arrangements as desired for a given implementation.

The recorded meeting view 108 may comprise multiple display frames 330-1 through 330-4. The display frames 330-1 through 330-4 may provide various types of information associated with participants 154-1-*p* and viewers 156-1-*r*. In the illustrated embodiment shown in FIG. 3, the various display frames 330-1-4 may be located in a predetermined order from a top of recorded meeting view 108 to a bottom of recorded meeting view 108, such as the display frame 330-1 at a first position near the top, the display frame 330-2 in a second position, the display frame 330-3 in a third position, and the display frame 330-4 in a fourth position near the bottom. It may be appreciated, however, that the display frames 330-1-4 and associated media content may be in any sequence as desired for a given implementation.

The display frames 330-1-4 may be used to display various types of information about the recorded meeting event 304 that allow the participants 154-1-*p* and/or the viewers 156-1-*r* to dynamically interact with each other in the context of the recorded meeting event 304. For example, the display frame 330-1 may include a GUI element allowing a viewer 156-1-*r* to take notes during the recorded meeting event 304. The notes may be personal notes for private consumption or published notes for the viewing community.

The display frame 330-2 may include a GUI element representing a Q&A session for the recorded meeting event 304. The Q&A session may include the Q&A communications made during the multimedia conference event, and any Q&A communications made subsequent to the multimedia conference event, such as when viewing the recorded meeting event 304. The Q&A pane shows the questions and answers that have been captured when the multimedia conference event (e.g., a web conferencing or live meeting) took place. The Q&A pane also reproduces the Q&A conversation that takes place once the recorded meeting event has been created. This may occur whether the recorded meeting event 304 is accessed from a shared resource (e.g., the multimedia conference server 130) or a local copy (e.g., the meeting consoles 110-1-*m*). The viewer 156-1-*r* is able to see the presence information 205 (whether they are online or not) of the original presenters or other attendees of the online meeting, or other viewers 156-1-*r* in case it is shared recording. The viewer 156-1-*r* can then use any chat or messenger tool which has been integrated with the components 114, 134, such as the MICROSOFT OFFICE COMMUNICATOR. Once the Q&A conversation is completed, the operator is prompted as to whether they would like to add it to the Q&A pane. If the operator chooses to do add the post-event Q&A with the normal Q&A, and if the recording is viewed locally, then the new Q&Q chats are added to a local copy. While if the recording is being viewed from a shared location, then a request to add the new Q&A transcript goes to the presenter of the multimedia conference event (which was recorded) where they can add the new Q&A transcript at their discretion.

In addition to a current state for the Q&A transcript shown in the Q&A pane, the display frame 330-2 may include a GUI element that allows an operator to post a question directly to a presenter. If the presenter is currently offline, the question is emailed to the presenter using a mail client for the meeting console 110-1-*m* currently used by the viewer 156-1-r. The presenter can then answer the question and also chose to add it to the new Q&A transcript.

The display frames 330-3, 330-4 may be used to display presence information 205 for various entities from the entity event list 204. For example, the display frame 330-3 may include participant presence information 320 for different presenters and attendees of the multimedia conference event. The display frame 330-4 may include viewer presence information 322 for previous and current viewers of the recorded meeting event 304 of the multimedia conference event. The presence information 205 may be dynamic and change as the status of the various entities change (e.g., online, away, busy, office, home, etc.).

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. Logic flow 400 may be representative of some or all of the operations executed by one or more embodiments described herein.

As shown in FIG. 4, the logic flow 400 may record a multimedia conference event to form a recorded meeting event at block 402. For example, the event capture module 210 may record a multimedia conference event to form a recorded meeting event. The event capture module 210 may receive various input media streams 202-1-f from the multimedia conference event, identifying information 205 for various participants 154-1-p in the multimedia conference event and viewers 156-1-r of the recorded meeting event 304, and post-event information 209. The event capture module 210 may store the various inputs with the recorded meeting event 304, or in a corresponding profile for the recorded meeting event.

The logic flow 400 may generate an entity event list for the recorded meeting event at block 404. For example, the entity event module 220 may generate an entity event list 204 for the recorded meeting event. The entity event list 204 may include a list of all entities that are related to the recorded meeting event, including participants 154-1-p, viewers 156-1-r, administrators, management, investors, and so forth. The entity event list 204 may include entity identifiers and contact information suitable for a given communications technique utilized between the entities. Additionally or alternatively, the entity event list 204 may be embedded with the recorded meeting event, along with software or scripts suitable for allowing logic at the meeting consoles 110-1-m to execute some or all of the operations for the recording management component 134, particularly including the playback operations for the event reproduction module 230, the presence detection module 250 and the event interface module 240.

The logic flow 400 may reproduce the recorded meeting event at block 406. For example, the event reproduction module 230 may reproduce the recorded meeting event for one or more viewers 156-1-r. The event reproduction module 230 may be integrated with the server meeting component 134, or in some cases, be implemented at the meeting consoles 110-1-m as a stand-alone application program or integrated module for the recording client component 114.

The logic flow 400 may display presence information for one or more entities from the entity event list while reproducing the recorded meeting event at block 408. For example, the event interface module 240 may display the presence information 205 for one or more entities from the entity event list 204. The presence information 205 may include, by way of example, participant presence information 320 and/or viewer presence information 322. The display frames 330-1-a displaying the presence information 205 may further display participant contact information, viewer contact information, desired communication mechanisms, and so forth.

Figure 5:
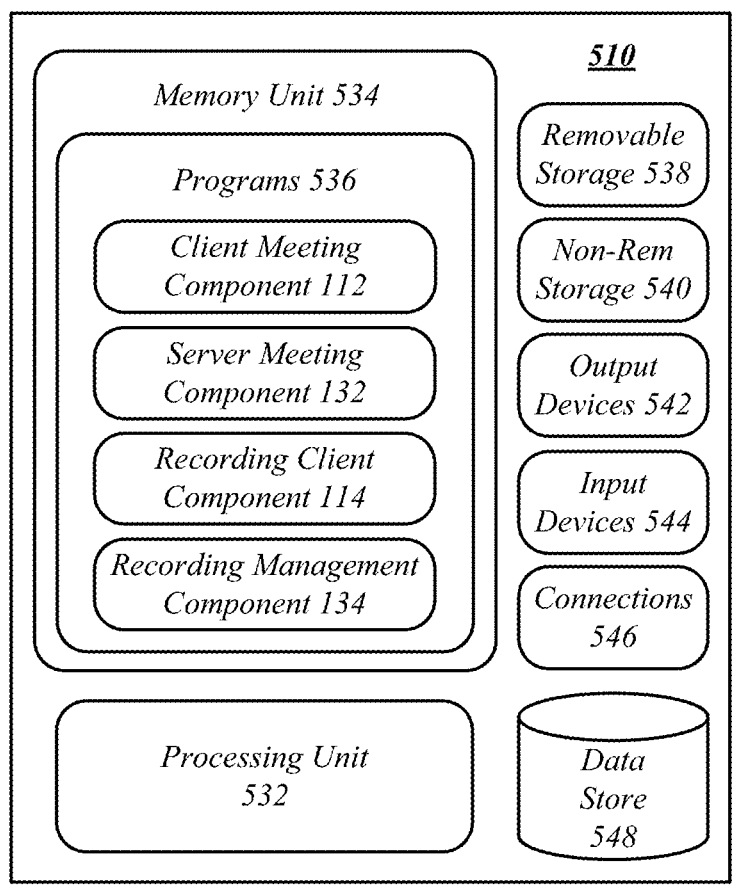
FIG. 5 illustrates an embodiment of a computing architecture.

FIG. 5 further illustrates a more detailed block diagram of computing architecture 510 suitable for implementing the meeting consoles 110-1-m or the multimedia conference server 130. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more application programs 536-1-t and accompanying data. Depending on the implementation, examples of application programs 536-1-t may include the client meeting component 112, the server meeting component 132, the recording client component 114, the recording management component 134, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
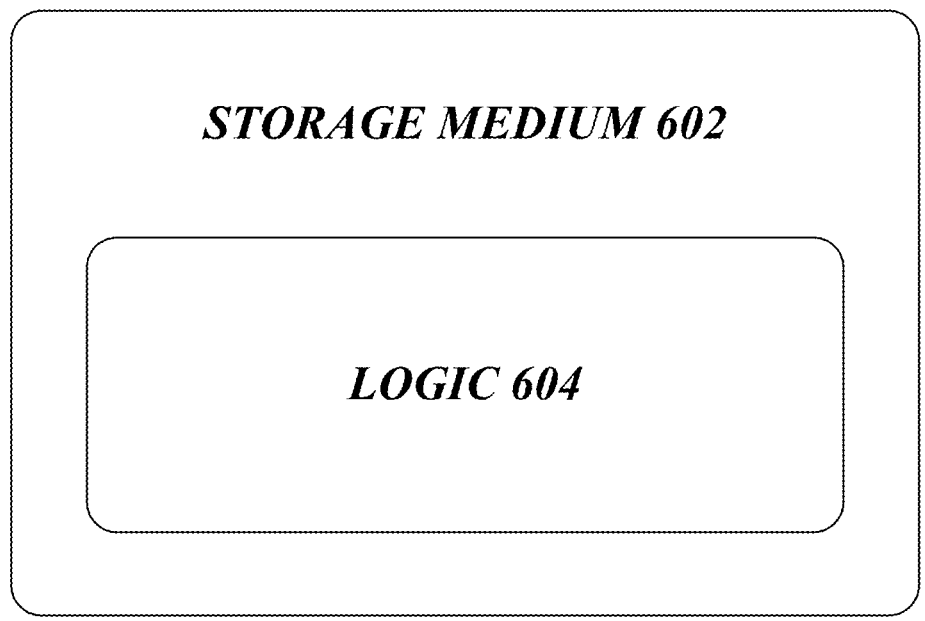
FIG. 6 illustrates an embodiment of an article.

FIG. 6 illustrates a diagram an article of manufacture 600 suitable for storing logic for the various embodiments, including the logic flow 400. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    recording a multimedia conference event to form a recorded meeting event;
    generating an entity event list for the recorded meeting event comprising participant identifying information for participants of the conference event and viewer identifying information for previous viewers of the recorded meeting event;
    displaying viewer presence information from the entity event list while reproducing the recorded meeting event for a current viewer;
    adding viewer identifying information for the current viewer to the entity event list; and
    recording post-event communications between the current viewer and one or more entities from the entity event list.

2. The method of claim 1, comprising generating the entity event list with participant information for participants of the multimedia conference event and viewer information for viewers of the recorded meeting event.

3. The method of claim 1, comprising displaying participant presence information from the entity event list while reproducing the recorded meeting event.

4. The method of claim 1, comprising storing participant contact information and viewer contact information with the recorded meeting event.

5. The method of claim 1, comprising recording event communications between participants of the multimedia conference event.

6. The method of claim 1, comprising recording post-event communications between a participant in the multimedia conference event and a viewer of the recorded meeting event.

7. The method of claim 1, comprising recording post-event communications between viewers of the recorded meeting event.

8. The method of claim 1, comprising generating a recorded meeting view having a first window to reproduce the recorded meeting event of the multimedia conference event, a second window to display participant presence information, a third window to display the viewer presence information, and a fourth window to display multimedia content representing previous and current communications between viewers and participants.

9. The method of claim 1 further comprising recording the post-event communications while reproducing the recorded meeting event.

10. The method of claim 1 further comprising processing the post-event communications via a question and answer pane.

11. An article comprising a storage medium containing instructions that if executed enable a system to:
record a multimedia conference event to form a recorded meeting event;
generate an entity event list, post-recording, for the recorded meeting event comprising participant identifying information for participants of the conference event and viewer identifying information for previous viewers of the recorded meeting event;
reproduce the recorded meeting event for a current viewer;
displaying viewer presence information for online current viewers of the recorded meeting event and the previous viewers from the entity event list;
add viewer identifying information for the current viewer to the entity event list; and
record post-event communications between the current viewer and one or more entities from the entity event list.

12. The article of claim 11, further comprising instructions that if executed enable the system to generate the entity event list with participant information for participants of the multimedia conference event and viewer information for viewers of the recorded meeting event.

13. The article of claim 11, further comprising instructions that if executed enable the system to record event communications between participants of the multimedia conference event, post-event communications between a participant in the multimedia conference event and a viewer of the recorded meeting event, or post-event communications between viewers of the recorded meeting event.

14. The article of claim 11 further comprising instructions that if executed cause the system to record the post-event communications while reproducing the recorded meeting event.

15. The article of claim 11 further comprising instructions that if executed cause the system to processing the post-event communications via a question and answer pane.

16. An apparatus, comprising:
a recording management component operative to manage recording and reproduction operations for a multimedia conference event, the recording management component comprising:
an event capture module operative to record a multimedia conference event to form a recorded meeting event;
an event entity module communicatively coupled to the event capture module, the event entity module operative to generate an entity event list, post-recording, for the recorded meeting event comprising participant identifying information for participants of the conference event and viewer identifying information for previous viewers of the recorded meeting event;
an event reproduction module communicatively coupled to the event entity module, the event reproduction module operative to reproduce the recorded meeting event for a current viewer and display viewer presence information for one or more other current viewers while reproducing the recorded meeting event; and
an event interface module communicatively coupled to the event reproduction module, the event interface module operative to add viewer identifying information for the current viewer to the entity event list, wherein the event capture module is further operative to record post-event communications between the current viewer and the one or more current viewers.

17. The apparatus of claim 16, the event entity module operative to generate the entity event list with participant information for participants of the multimedia conference event and viewer information for viewers of the recorded meeting event.

18. The apparatus of claim 16, comprising a multimedia conference server having a server meeting component and the recording management component, the multimedia conference server operative to host the multimedia conference event.

19. The apparatus of claim 16 wherein the event capture module records the post-event communications while the event reproduction module reproduces the recorded meeting event.

20. The apparatus of claim 16 further comprising a display frame including a GUI element representing a question and answer pane, wherein the recording management component is further operative to process the post-event communications using the question and answer pane.

* * * * *